United States Patent

[11] 3,563,403

[72] Inventors August G. Luisada
Waymart;
Leonard P. Frieder, Clarks Green, Pa.
[21] Appl. No. 715,064
[22] Filed Mar. 21, 1968
[45] Patented Feb. 16, 1971
[73] Assignee Gentex Corporation
New York, N.Y.
a corporation of Delaware

[54] AIRCRAFT CARGO BOX
16 Claims, 11 Drawing Figs.
[52] U.S. Cl. ................................... 220/1.5,
220/4, 220/46, 220/81
[51] Int. Cl. ................................... B65d 7/24,
B65d 53/00
[50] Field of Search ........................... 220/1.5, 9F,
4, 46, 81

[56] References Cited
UNITED STATES PATENTS
| | | | |
|---|---|---|---|
| 2,778,072 | 1/1957 | Palisca | 220/46UX |
| 2,869,750 | 1/1959 | Doerr | 220/4 |
| 2,896,271 | 7/1959 | Kloote | 220/9(F)UX |
| 2,907,492 | 10/1959 | Robertson | 220/81 |
| 2,920,781 | 1/1960 | Butcher | 220/1.5X |
| 3,259,264 | 7/1966 | Best | 220/9(F)X |
| 3,261,493 | 7/1966 | Smith | 220/4X |

Primary Examiner—George E. Lowrance
Attorney—Shenier & O'Connor

ABSTRACT: A cargo box especially adapted for use in housing aircraft cargo, which box is made up of a base or pallet, sides, a top or cover, and ends, all of which may readily and expeditiously be assembled to provide a watertight box which is at once able to withstand relatively heavy gravity loads incident to operation of the aircraft while at the same time being extremely light for the result produced. The construction of the box is such that it may readily be knocked down upon arrival at a destination and reused.

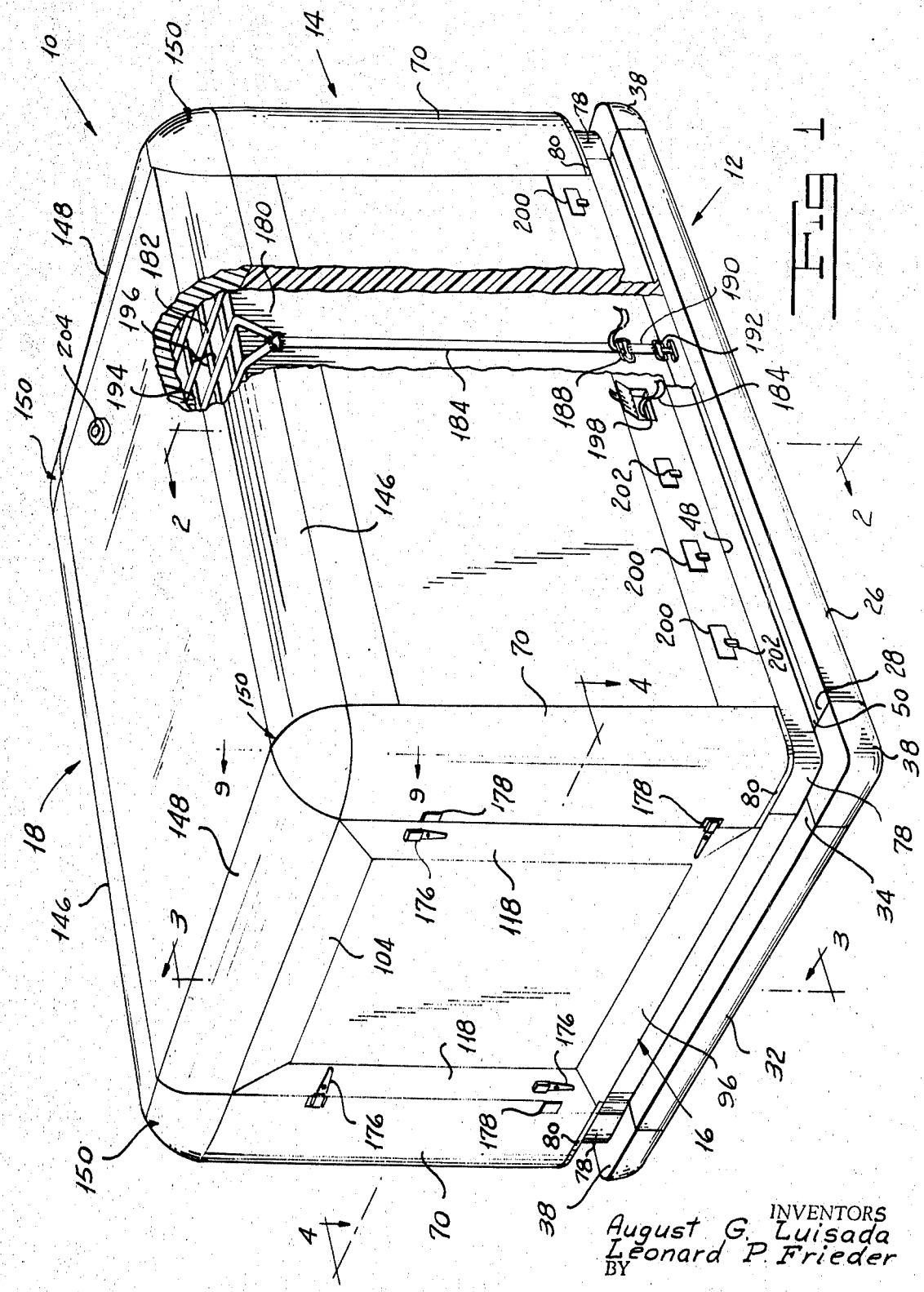

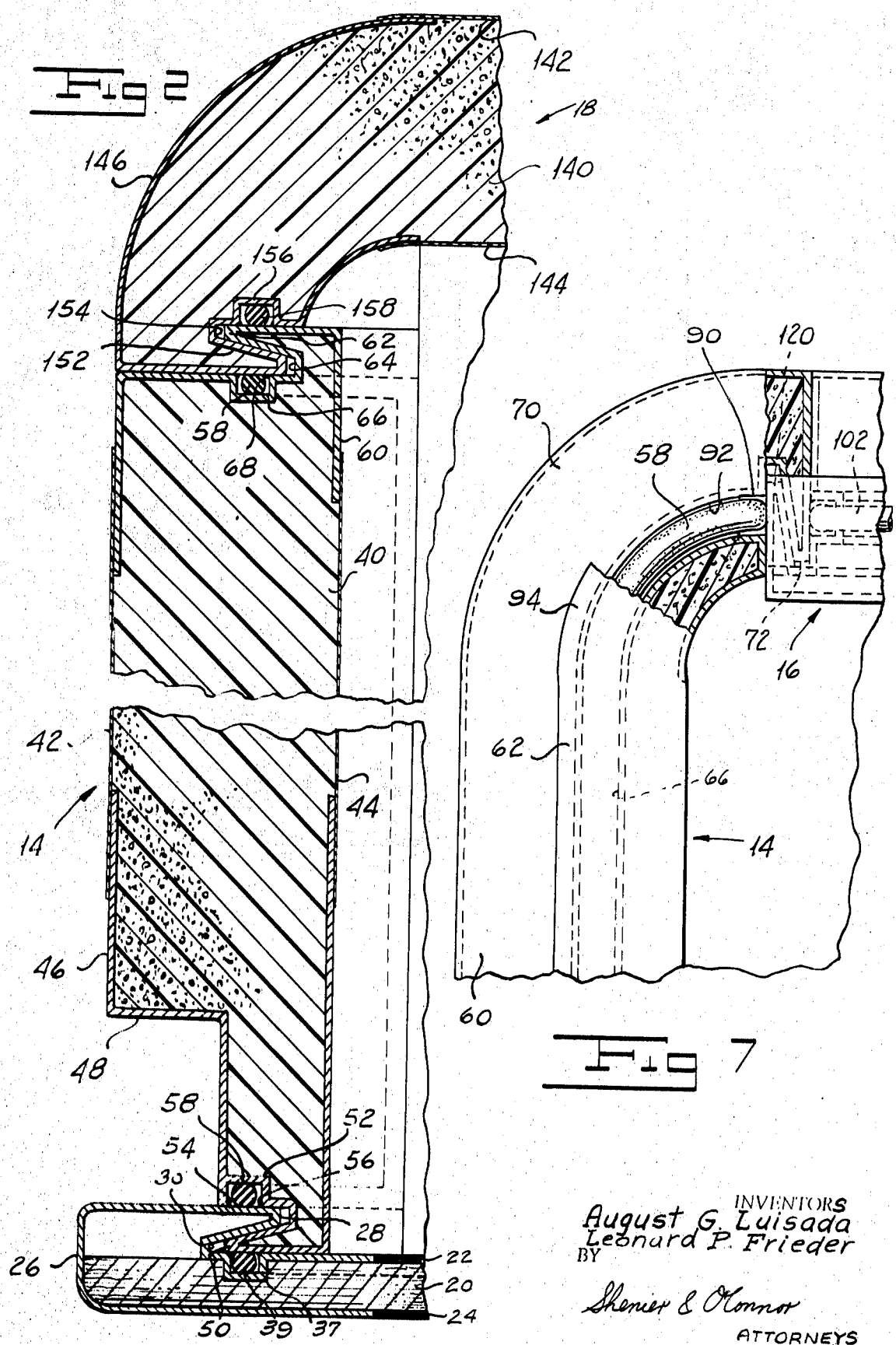

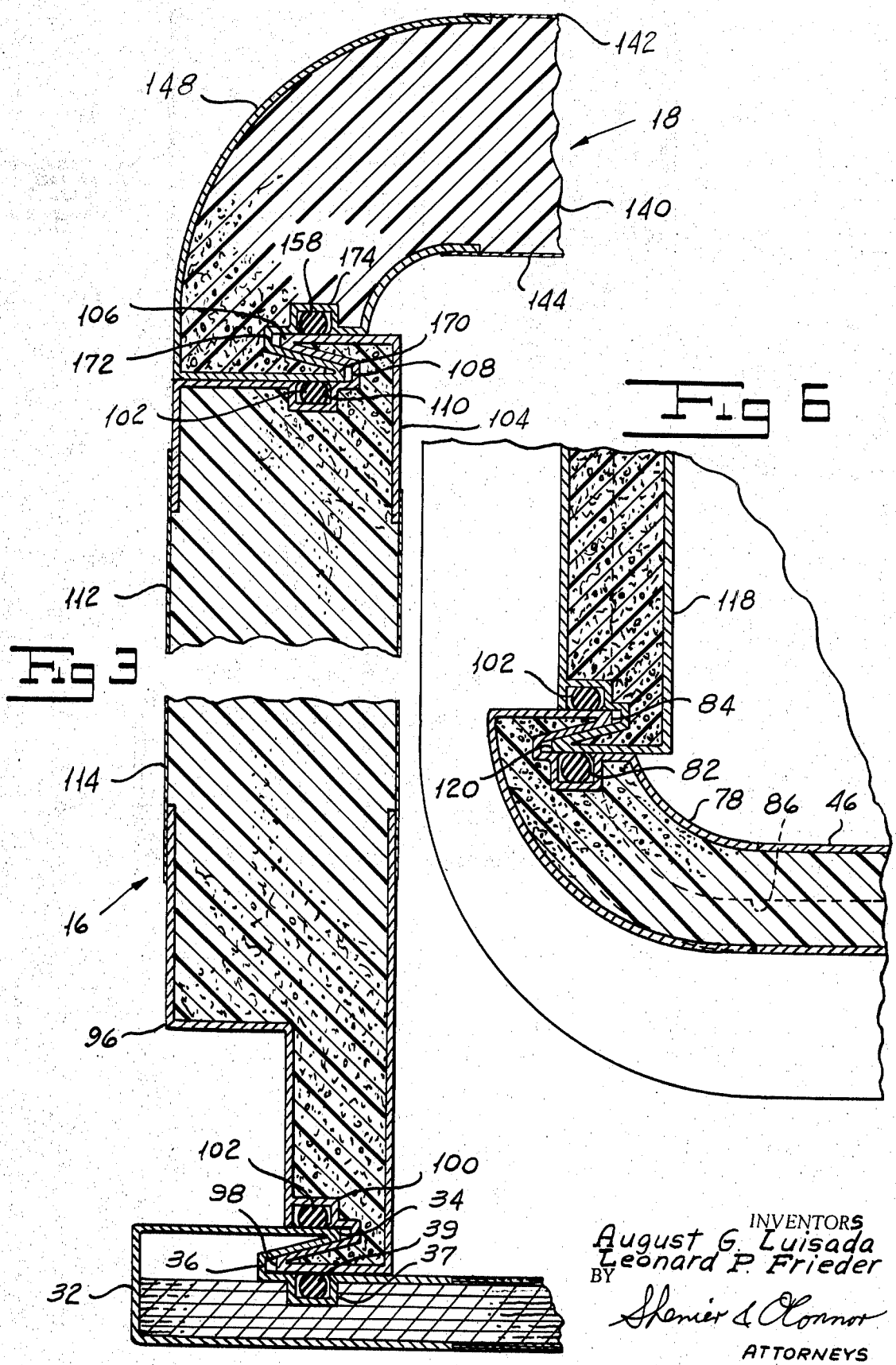

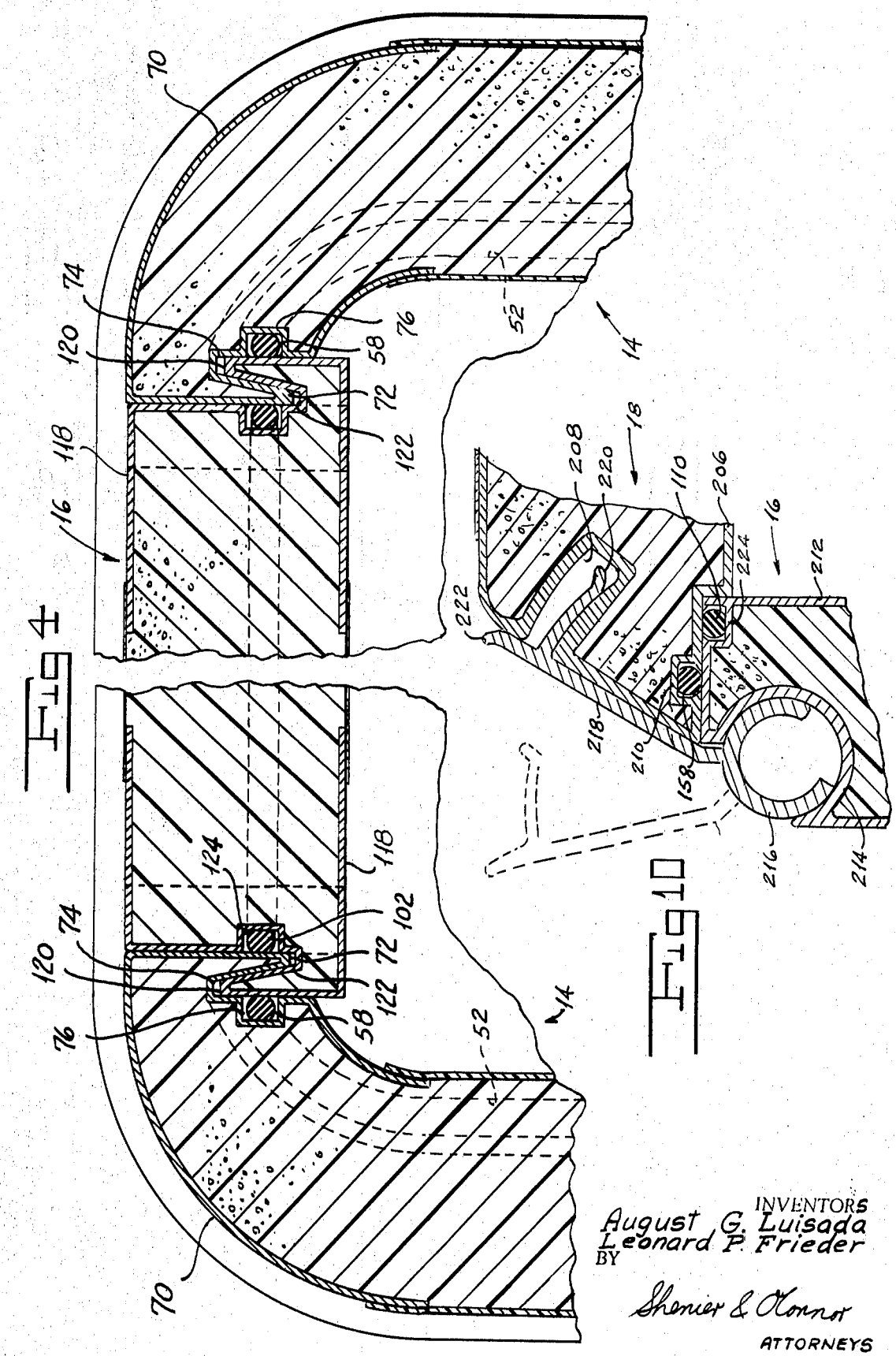

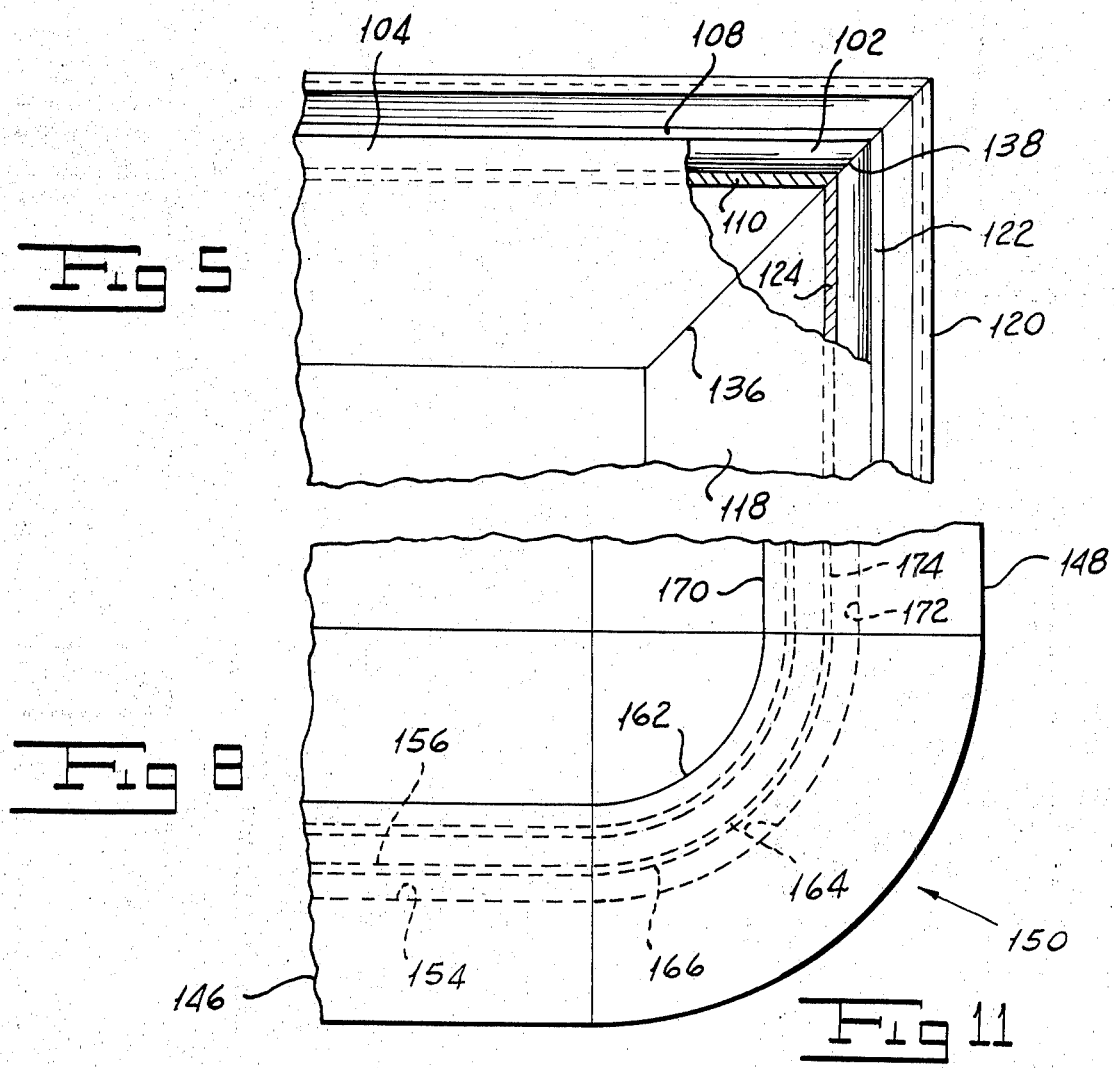
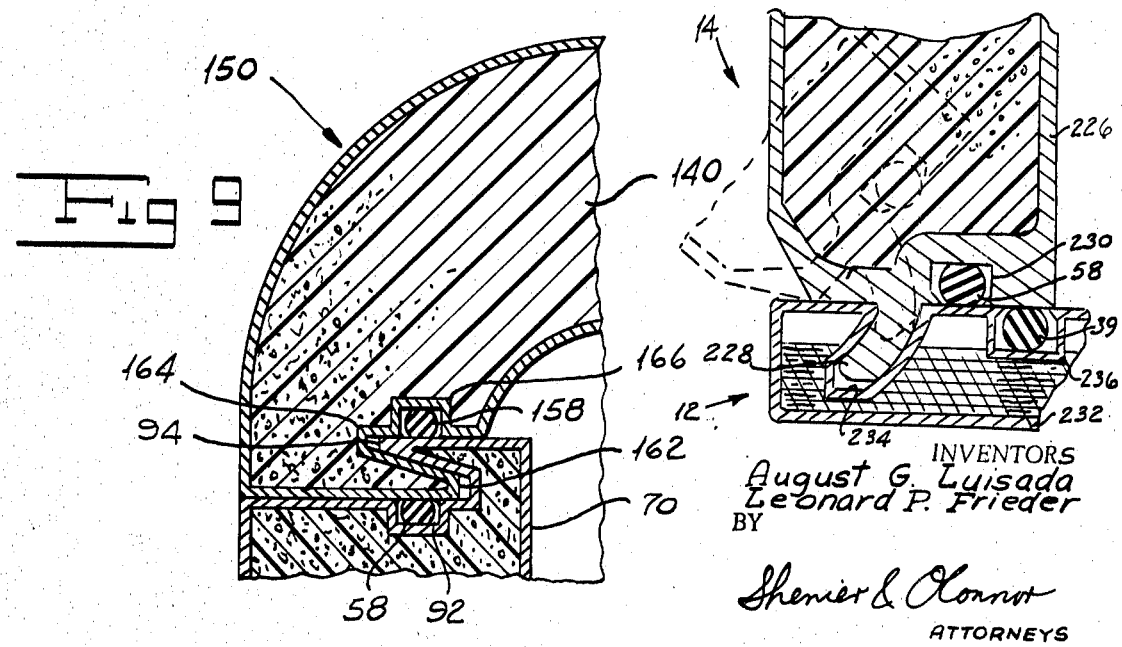

3,563,403

1
AIRCRAFT CARGO BOX

BACKGROUND OF THE INVENTION

Present-day requirements for stowage of aircraft cargo require that a large number of items be handled as a unit. In order to facilitate this operation, it has been suggested that a relatively large container be provided for housing a plurality of smaller items or containers so as to make up a cargo unit which can efficiently be handled. These large containers of necessity must meet relatively stringent requirements. They must be sufficiently strong so as to handle cargo having a relatively large aggregate weight. In addition, they must be so constructed as effectively to withstand gravity loads incident to operation of the aircraft. While no great difficulty would be involved in making a container which is sufficiently strong to meet these requirements, another most important consideration is that the container be relatively light. None of the containers known in the prior art successfully meet the inconsistent requirements of strength and low weight necessary to provide an effective aircraft cargo box.

In a particular instance it is required to produce a container with a base capable of being used as a bulk cargo pallet measuring approximately 8 feet by 10½ feet. The container is required to be 8 feet high. The container, including the pallet, must not weigh in excess of 600 pounds and yet must be capable of handling 7 tons of cargo. When fully loaded, the container must be able to withstand a vertical load in the down direction of 5 g's and a vertical load in the upward direction of about 3 g's. Fore and aft loads of 3 g's must be withstood. The maximum side load permissible is 1½ g's. The box is required to be able to be used with an existing pallet weighing about 255 pounds. Considering the maximum unloaded weight of the container including the pallet, there remains only around 345 pounds available for the top, sides and ends of the container, all of which must meet the requirements outlined above.

Not only is it necessary that the cargo box be strong and light but, also, it is highly desirable for efficient handling that it be able to be erected and then knocked down in a simple and expeditious manner. Owing to the fact that in handling such a unit adverse weather conditions are likely to be encountered, it should be watertight. Provision should also be made for securing the box in position within the aircraft to prevent shifting of the entire box.

It is likely in use of a large cargo container that a wall thereof may at some time be damaged by puncturing or the like. Our construction permits a damaged part of the box to be replaced to eliminate the need for replacing the entire box. Similarly, parts of one of our boxes are interchangeable with those of another one of our boxes.

We have invented an aircraft cargo box which is strong enough to withstand the loads incidental to its use and yet which is light enough to meet the stringent requirements of the industry. Our box is capable of handling a heavy cargo load. Our box moreover is watertight. It may be assembled and disassembled in a rapid and expeditious manner. The parts making up our box may be stacked for storage in a relatively small space.

SUMMARY OF THE INVENTION

One object of our invention is to provide an aircraft cargo box which is strong enough to withstand the loads incident to its use while at the same time being lighter than the maximum weight permitted by industry standards.

Another object of our invention is to provide an aircraft cargo container comprising a pallet base capable of handling heavy loads.

A further object of our invention is to provide an aircraft cargo box which can readily and expeditiously be assembled and then knocked down.

Still another object of our invention is to provide an aircraft cargo box which is watertight.

Yet another object of our invention is to provide an aircraft cargo box which can be disassembled for storage in a small space.

A still further object of our invention is to provide an aircraft cargo box, parts of which are readily replaceable and are interchangeable with parts of others of our boxes.

Other and further objects of our invention will appear from the following description.

In general our invention contemplates the provision of an aircraft cargo box comprising a pallet, base, sides, ends and a cover, all of which may readily and expeditiously be assembled to form a box by virtue of interengageable elements on the peripheries of the members making up the box. Associated with the interengageable elements are seals which render the box watertight when assembled. The sides, ends and cover of our box are so constructed as to be extremely light while at the same time being able to withstand gravity loads as required. Our box may readily be knocked down upon arrival at its destination.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a perspective of our assembled aircraft cargo box viewed from the right corner thereof with parts broken away;

FIG. 2 is a vertical section through one side of our aircraft cargo box taken along the line 2-2 of FIG. 1 and drawn on an enlarged scale;

FIG. 3 is a vertical sectional view through one end of our aircraft cargo box taken along the line 3-3 of FIG. 1 and drawn on an enlarged scale;

FIG. 4 is a horizontal sectional view taken through one end of our aircraft cargo box along the line 4-4 of FIG. 1 and drawn on an enlarged scale;

FIG. 5 is a fragmentary view of a corner of the outside of an end panel of our aircraft cargo box with the panel disassembled;

FIG. 6 is a fragmentary horizontal sectional view of a corner of our aircraft cargo box adjacent the bottom of the box;

FIG. 7 is a fragmentary top plan view of the left rear corner of our aircraft cargo box with the cover removed and with a part broken away;

FIG. 8 is a fragmentary view of the underside of the corner of the cover of our aircraft cargo box;

FIG. 9 is a fragmentary sectional view of a corner of the top of our aircraft cargo box taken along the line 9-9 of FIG. 1 and drawn on an enlarged scale;

FIG. 10 is a fragmentary sectional view illustrating an alternate means for securing the top to the end or side panels of our aircraft cargo box; and FIG. 11 is a fragmentary sectional view of an alternate means for securing a side or end panel of our aircraft cargo box to the pallet.

DESCRIPTION OF THE PREFERRED EMBODIMENTS

Referring now to FIG. 1 of the drawings, our aircraft cargo box, indicated generally by the reference character 10, includes a base or pallet, indicated generally by the reference character 12, two sides, one of which is indicated generally by the reference character 14, two ends, one of which is indicated generally by the reference character 16, and a cover indicated generally by the reference character 18.

Referring now to FIGS. 1 to 3, the pallet or base 12 includes a body 20 formed of a suitable material such, for example, as plywood. We provide the upper and under surfaces of the central portion of the body 20 with respective abrasion resistant coverings 22 and 24 which may be made of any suitable material such, for example, as glass fiber cloth which has been impregnated with a suitable resin, such as an epoxy resin or the like. Alternatively to employing glass fiber cloth, we may use laminated paper impregnated with a suitable resin to form the skins 22 and 24.

Each of the side edges of the pallet 12 is provided with an extruded aluminum edging member 26 so shaped as to provide an inwardly extending tongue 28 and corresponding groove 30 extending along the sides and around the corners for reasons which will be explained hereinafter. Each of the end edges of the pallet 12 carries an aluminum extrusion 32 so formed as to provide an inwardly extending tongue 34 and a corresponding groove 36. At each of the corners of the pallet 12 we provide aluminum corner members 38 to complete the aluminum edging of the pallet 12. These corner members 38 may be attached to members 26 and 32 by any suitable means such as by welding or the like. The pallet edges are formed with a channel 37 under the tongue 28 and extending around the entire pallet to receive a sealing gasket 39.

The pallet 12 is so constructed as to be able to handle up to seven tons of cargo. Owing to the fact that it must handle this large load, it makes up a relatively large part of the weight of the box 10. By way of example, pursuant to the example of one set of requirements outlined above, our pallet 12 may weigh as much as 255 pounds.

Each of the sides 14 of our box includes a body 40 which we make of an appropriately strong and relatively light material. The inner and outer surfaces of the body 40 carry respective abrasion resistant skins 42 and 44. The body 40 may be made of a rigid low-density polyurethane or polystyrene foam material. The skins 42 and 44 may be made of a material such, for example, as a glass fiber fabric impregnated with a suitable thermosetting resin, such as an epoxy resin or a phenolic resin for example. Alternatively to using a glass fabric, the skins 42 and 44 may be made from a resin incorporating glass fibers.

We provide an extruded aluminum edging 46 running along the bottom of each of the sides 14 to points adjacent the corners of the box. In making a side 14, for example, the unit may be molded with the edging 46 and the upper edging, to be described hereinafter, forming parts of the mold so as to be filled with the synthetic resin adapted to foam making up the body 40. The skins 42 and 44 can then be applied and are extended downwardly over a portion of the edging 46 to which they are adhered by an impregnating adhesive.

We provide each of the sides 14 with inwardly directed recesses 48 extending along the lower edge of the side. As will be apparent from the description given hereinafter, the recesses 48 permit the application of devices for holding the container securely in position on the deck of an aircraft or the like.

We form the lower ends of the members 46 below the the recesses 48 with outwardly extending tongues 50 which are adapted to fit into the grooves 30 of the extrusions 26 in a manner to be described. Each of the extrusions 46 has a recess 52 over the tongue 50 and extending along the length of the extrusion. Lips 54 and 56 at the edges of the grooves retain a sealing gasket 58 in position within the groove. As will be described in more detail hereinafter, the sealing gasket 58 engages the upper surface of the tongue 28 and the under surface of tongue 50 engages the gasket 39 when the box is assembled.

An upper edge extrusion 60 runs along the top of each of the sides 14 between points adjacent the corners of the box. We form the extrusion 60 so as to provide a tongue 62 and corresponding groove 64. A channel 66 having edge-retaining lips 68 similar to the lips 54 and 56 receives a portion of the gasket 58 which runs entirely around the periphery of the side as will be apparent from the description given hereinafter.

Referring now to FIGS. 1, 4 and 6, each end of each of the sides 14 carries a vertically extending corner extrusion 70 of aluminum. Each of the extrusions 70 extends from a point adjacent the base upwardly to a point near the top of the side. We form the edge of each of the extrusions near the ends of the box with a vertically extending, inwardly directed tongue 72 and corresponding groove 74. A vertically extending channel 76 in each extrusion 70 under the tongue 72 receives a portion of the side sealing gasket 58.

We provide the sides 14 with feet 78 at each corner below the corner extrusions 70. Each of the feet 78 includes a flange 80 extending outwardly and welded to the underside of the corresponding corner extrusion 70 and to the side extrusion 46. We provide the foot 78 with a channel 82 forming a continuation of channel 76 and leading to a curved channel 86 extending back to the channel 52. A tongue 84 on the foot provides a continuation of the tongue 72.

Referring now to FIGS. 1, 7 and 9, we provide the top of each corner extrusion 70 with an opening 90 which connects channel 76 in the vertical edge of the side with a curved channel 92 leading into the upper edge channel 66. A curved tongue 94 forms a continuation of tongue 62 around the corner. Gasket 58 comes up through opening 90 around channel 92 and into channel 66.

From the structure just described, it will be apparent that the sealing gasket 58 associated with a side 14 extends entirely around the periphery of the side. Its path may readily be traced as follows: Beginning with the upper channel 66 in the extrusion 60, the gasket travels along the top of the side to one of the corner top pieces 90. It runs along the arcuate channel 92 and down through opening 90 into the corresponding vertical channel 76. At the foot 78 it runs through the extension 82 of the channel 76 and then into and through the arcuate channel 86 which leads into the channel 52 in the extrusion 46. Gasket 58 runs along that channel and through the other foot channel 86 of that side 14, thence upwardly through the channel 76 and through an opening 90 and channel 92 back to the channel 66. As will be apparent from the description hereinafter, when our box is assembled gasket 58 provides a seal around the entire periphery of the side 14.

Referring now to FIGS. 1 and 3 to 6, each of the end panels 16 has a lower extrusion 96 similar in shape to the lower extrusion 46 of a side 14. We form extrusion 96 with a foot or tongue 98 at the base thereof which is adapted to cooperate with the tongue 34 of the pallet extrusion 32. Extrusion 96 has a channel 100 located above the tongue 98 and having retaining lips for holding a portion of the end panel gasket 102.

Each of the end panels includes an upper extrusion 104 of aluminum which is similar in configuration to the side upper extrusions 60. We provide the upper extrusion 104 with an outwardly extending tongue 106 and corresponding groove 108 as well as with a channel 110 which receives and retains a portion of the gasket 102. It is to be understood of course that we form each of the end panels 16 in a manner similar and of the same materials as are used to make the sides 14. That is, the body 112 of the end is made of foamed plastic and is provide with skins 114 and 116 which resist abrasion and which extend over portions of the aluminum extrusions 96 and 104. The gaskets 58, as well as the gaskets 102, are made of any suitable material such, for example, as natural or synthetic rubber.

The end panels 16 include respective vertically extending extrusions 118 extending along the vertical edges of the ends. Each extrusion 118 is formed with a tongue 120 and with a corresponding groove 122 for cooperation with the tongue and groove 72 and 74 of a corner extrusion 70 and the continuations thereof provided by feet 78. Vertically extending channels 124 in the extrusions 118 receive and retain portions of the end gasket 102.

Referring now to FIG. 5, adjacent the top of the end members the extrusions 118 and 104 are joined with a mitered butt joint and welded together as indicated by the line 136. At the upper corners of the ends in order that the gasket 102 will provide a continuous seal, we cut the gasket at a 45° angle and join the cut ends with a suitable adhesive to form the gasket corner 138. We perform a similar operation at each point at which the gasket is required to make a right angle bend.

Referring to FIGS. 1 to 3, 8 and 9, the cover 18 of our box includes a body 140 having inner and outer skins 142 and 144 formed in the same manner as are the sides and ends of the box. We provide the cover or top with extrusions 146 extending along the sides of the top and with extrusions 148 extending along the ends of the top, as well as with corner members, indicated generally by the reference character 150. Each of the side extrusions 146 is provided with a tongue 152 and corresponding grooves 154. Channels 166 receive the cover gasket 158.

We provide each of the extrusions 148 with an inwardly directed tongue 170 and groove 172 for cooperation with tongue 106 and groove 108. Channels 174 in the extrusions 148 receive the portions of gasket 158 extending along the sides of the box.

Each corner member 150 has a curved, inwardly directed tongue 162 and corresponding groove 164 for cooperation with tongue 91 and groove 93. A curved channel 166 receives the cover gasket 158 in the region of the corner of the box. We weld or otherwise secure member 150 to members 146 and 148.

As an alternative to the side, end and top panel construction described hereinabove, we may form the skins of thin sheets of synthetic resin reinforced with glass fiber filaments. Another alternative is to form the panels of the box by riveting or welding aluminum, magnesium or other light metal sheets to the extrusions forming the skins for each panel. In this particular embodiment, we employ core material which is a 2 pound density polyurethane foam, foamed in place between the skins.

Referring to FIG. 1, in order to hold the end panel 16 securely in place when the box is assembled in a manner to be described hereinbelow, we provide each of the end panels with a plurality of pivoted dogs 176 adapted to be rotated to engage strikes 178 on the corners of the side panels when the end panels are in place. The construction of the dogs and strikes is such as will cam the end panels firmly in place effectively to seal the cooperating tongues and gaskets.

Preferably we provide an arrangement for tying down cargo such as is represented by the block 180 in FIG. 1. For this purpose we arrange a net 182 of any suitable type known to the art over the cargo 180 and provide it with tie-down straps 184, the free ends of which are adjustably received in D-rings 188 carried by a length of webbing 190 attached to a retainer 192 in the pallet along the sides thereof. As will be described hereinafter, tension-releasable hooks, including separable parts 194 and 196, are used to suspend the net from the top before cargo is loaded into the box. For example, the element 194 may be secured in the top and the hook element 196 releasably engaged in the element 194.

We provide each side of the box with a plurality of access openings 198 through which the free ends of the tie-down straps 184 extend before the net 182 is drawn down over the cargo. Doors 200 are adapted to close over the openings 198 and can be latched in place by suitable dogs or latches 202. We provide gaskets around the openings 198 to maintain the watertight integrity of our container.

In use of our container when it is to be packed prior to being loaded onto the aircraft, the sides 14 first are erected on the pallet 12 and the cover 18 is assembled on the sides. When this has been done, the rear end panel is assembled from inside the box and is locked in place by use of dogs 176 or the like.

Next, the net 182 is suspended from the top 18 by means of the tension-releasable hooks 196. The free ends of the tie-down straps 184 are threaded through the D-rings 188 and are extended out through access openings 198. The box is now ready to be loaded with cargo. It is to be noted that we do not provide any retaining elements 192 along the ends of the pallet 12 so as not to interfere with loading of cargo from either end of the box. 162 When the box has been loaded, the remaining end panel 16 is assembled on the box. This can be achieved by standing the end panel bottom on the edge of the pallet leading with the right top corner into the box until stopped by the side and top panels. Then with a relatively small force, the top is moved about one-half inch to the left to move the left top corner inside the box. The end panel then is lifted slightly and drawn into place to engage the corresponding tongues and grooves of the end panel and of the pallet side panels and top. The dogs 176 are then operated firmly to secure this end panel in place. If desired, suitable key-operated locks can be provided.

As an alternative to the construction of the end panels described above, we might put the end locking edge or tongue of the top panel on a hinge extending all the way along the end of the top. This could then be swung up to permit the end panel to be moved into place and then returned to a position at which it engages the end panel. Suitable locks and seals of course would be provided.

On arrival at its destination, the box can be unloaded by reversing the above procedure and, if desired, the box may be completely knocked down and stored in a relatively small space.

It will be seen that as our box is assembled, the pairs of cooperating tongues engage gaskets to provide double seals around the entire peripheries of all members. Thus, we effectively seal the interior of the container against entry of moisture. If desired, we might also provide a pressure relief device 204 in one of the walls of the box which might be of the type which is air permeable but moisture impermeable, such as is shown in U. U.S. Pat. No. 3,072,285.

Referring to FIG. 10, we have shown an alternate way of securing the top 18 to the front end panel 16, for example. In this form of our invention we provide an extrusion 206 running along the front edge of the top 18. Extrusion 206 is provided with an inwardly and downwardly extending, generally arcuate slot 208 running along the front edge of the top. The underside of the extrusion 206 is provided with a channel 210 for receiving a portion of the gasket 158. With the exception of the extrusion, the construction of the top panel 18 is generally similar to that described hereinabove.

In the form of our invention shown in FIG. 10 we provide the front end panel 16 with a top extrusion 212 having a generally circular recess 214 therein which provides a bearing surface for a shaft portion 216 of an extrusion having an arm 218 provided with a curved hook 220 adapted to ride into the recess 208. A handle portion 222 permits the hook to be extracted when desired. A channel 224 receives a portion of the gasket 102.

Referring now to FIG. 11, as an alternative to the double tongue and groove arrangement described hereinabove for joining the side and end panels to the pallet, we may provide the side panel 14, for example, with an extrusion 226, the bottom edge of which is formed with a generally arcuate tongue or hook 228 and with a channel 230 for receiving a portion of the gasket 58. The pallet 12 in this form of our cargo box is provided with an extrusion 232 along the edge thereof, which extrusion has an elongated generally arcuate slot or groove 234 for receiving the tongue or hook 228. We provide the extrusion 232 with a channel 236 for receiving the gasket 39. It will readily be appreciated that we could provide the pallet extrusions with the tongues or hooks 228 and provide the lower edges of the end and side panels with grooves 234.

In another preferred embodiment of our cargo box we provide the pallet 12 with the peripheral generally arcuate groove or slot 234 and provide the side and end panels with hooks 228 for insertion in the groove 234. One of the end panels is connected to the top and to the side panels by the double tongue and groove method. We connect the other end panel to the top and to the side panels by use of the pivoted hook groove method shown in FIG. 10. With this construction the container may be opened by disengaging the hooks of the end panel from the side panels and top, tilting the panel outwardly and removing it. The full end opening is then available for access to the box interior.

In a further preferred embodiment of our box we provide the pallet with peripheral hooks 228 and form the lower edge extrusions of the side and end panels with grooves 234 for receiving the hooks. We then use the pivoted hook and groove arrangement shown in FIG. 10 to join the end panels to the side panels and to the top. This arrangement has the advantage of permitting removal first of any one of the top or end or side panels. Thus the contents can be removed in any order, depending upon which member of the box is removed first.

In all forms of our cargo box with the box assembled, the interengaged connecting means prevent the top panel from being lifted by internal forces when the plane descends and also cause the top panel to absorb stresses caused by the side or end panels when the plane accelerates or decelerates so as to result in internal forces on the side or end panels. When the parts are thus assembled, the gaskets provide seals as described.

While we have shown the form of our invention in FIG. 10 as being used only to join the upper edge of the front end panel 16 to the front edge of the top 18, it will readily be appreciated that we may use this arrangement around the entire periphery of the top. We may, moreover, use this arrangement along vertical edges of the side and end panels. Alternatively, it can used in combination with the tongue and groove arrangements heretofore described. It has the advantage of permitting the front end panel to be swung outwardly rather than being pushed inwardly when the box is to be unloaded.

In all boxes of the type known in the prior art, the erecting or assembling elements are located at spaced points along the edges of the box. These fittings or elements must be made stout enough to withstand the loads to which the structure is subjected. In our construction the interlocking assembling means extend continuously around all edges of the box. Owing to this construction our box is tighter and more secure than are boxes of the prior art while at the same time being light.

It will be seen that we have accomplished the objects of our invention. We have provided an aircraft cargo box which is strong enough to withstand loads required for its use while at the same time being light enough to meet maximum weight requirements of industry. Our aircraft cargo box can readily and expeditiously be assembled and knocked down. Parts thereof are replaceable and are interchangeable with others of our cargo boxes. It can be stored in a relatively small space. Our cargo box is watertight.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

We claim:

1. A cargo box including in combination a generally rectangular base, respective inwardly directed tongues extending along the sides of said base, a top having a central portion and a downwardly extending peripheral portion providing an undersurface generally parallel to the surface of said central portion, an inwardly directed tongue extending around the entire periphery of said downwardly extending portion, means forming a channel in said undersurface above said tongue around the entire periphery of said top and a gasket in said channel, a pair of said side panels each having a central portion and corner pieces carried by said central portion, said corner pieces having at the edges thereof surfaces generally parallel to the surface of said central portion, an outwardly directed tongue extending along the upper edge of said panel and around the upper edge of said corner pieces, respective inwardly directed tongues extending downwardly along the edges of said corner pieces, an outwardly directed foot extending along the lower edge of said panel, means forming a channel in the edge of said panel, said channel extending around the entire periphery of the side panel under said outwardly directed tongue and under inwardly directed tongues and inwardly of said foot and a gasket in said channel, respective end panels, means providing an outwardly directed tongue extending continuously along the top edge and down the side edges of said panel, an outwardly directed foot extending along the lower edge of said panel, means forming a channel in the edge of said panel, said channel extending around the entire periphery of said panel under said tongue and inboard of said foot and a gasket in said channel and a base, means providing respective inwardly directed tongues extending along the end edges and along the side edges of said base, said side panel and end panel feet engaging said base tongues to urge the portions of said side panel and end panel gaskets running along the lower edges of the panels into engagement with said base, said inwardly directed side panel tongues engaging the portions of the outwardly directed end panel tongues running along the sides of the end panel to cause the end panel tongue portions to engage the side panel gaskets and to cause the inwardly directed side panel tongues to engage the end panel gaskets, said outwardly directed side panel tongues and the portions of said end panel tongues running along the top of said end panels engaging the top tongues so that said top tongue engages portions of said end panel gaskets and said side panel gaskets and said outwardly directed side panel tongues and said end panel tongue top portions engage said top gasket.

2. A cargo box including in combination, a generally rectangular base, a pair of generally rectangular side panels, a pair of generally rectangular end panels, and a generally rectangular top panel, first readily disengageable interlocking elements respectively unitary with and extending along the bottom edges of each of said side and end panels substantially from end to end thereof and unitary with and extending around the periphery of said base for connecting said side and end panels to said base, second readily disengageable interlocking elements respectively unitary with and extending along the front and rear edges of said side panels substantially from top to bottom thereof and unitary with and extending along the side edges of said end panels substantially from top to bottom thereof for connecting said side panels to said end panels and means connecting said top panel to said side and end panels, said second elements respectively comprising inwardly directed tongues along the end edges of said side panels and outwardly directed tongues along the side edges of said end panels.

3. A cargo box as in claim 2 in which each of said side panels and said end panels and said top comprises generally channel shaped peripheral members formed of metal, a body of foamed synthetic resin surrounded by said members and skins of resin impregnated fibrous material.

4. A cargo box as in claim 2 in which each of said side panels comprises a central portion and end pieces forming the corners of said box.

5. A cargo box as in claim 2 in which each of said side panels comprises a central portion and respective corner pieces forming corners of said box, said corner pieces having at the edges thereof surfaces generally parallel to the surface of said central portion, said top panel connecting means comprising an outwardly directed tongue extending along the upper edge of said side panel throughout said central portion and around said corners to points adjacent said corner piece surfaces, said second element inwardly directed tongues extending along the edges of said corner pieces at said surfaces.

6. A cargo box as in claim 2 in which each of said side panels comprises a central portion and respective corner pieces forming corners of said box, said corner pieces having at the edges thereof surfaces generally parallel to the surface of said central portion, said top panel connecting means comprising an outwardly directed tongue extending along the upper edge of said side panel throughout said central portion and around said corners to points adjacent said corner piece surfaces, said second element inwardly directed tongues extending along the edges of said corner pieces at said surfaces, each of said sides comprising means forming a channel extending around the periphery thereof, said channel running along the upper edge of said side panel under said outwardly directed tongue and along the edges of said corner pieces under said inwardly directed tongues and along the lower edge of said side panel, and a gasket disposed in said channel.

7. A cargo box as in claim 2 in which said first elements comprise means forming an outwardly directed foot extending along the bottom of said side and means forming a groove along the edge of said base for receiving said foot.

8. A cargo box as in claim 2 in which said first elements comprise means forming an outwardly directed foot extending along the bottom of said side and means forming a groove along the edge of said base for receiving said foot, means forming a channel in the bottom of said side inboard of said foot, said channel extending along the length of said side and a gasket in said channel for engaging the surface of said base.

9. A cargo box as in claim 2 in which said elements and top connecting means comprise outwardly directed tongues extending around the periphery of said ends, means forming respective channels under said tongues and a gasket disposed in said channels.

10. A cargo box as in claim 2 in which said ends are generally rectangular whereby said channels have square corners, each of said gaskets having obliquely cut ends at said corners and an adhesive for securing said cut ends to each other to form mitered butt joints.

11. A cargo box as in claim 2 in which said top panel connecting means comprises a curved surface along an edge of said top and a pivoted hook at the top of one of said end panels.

12. A cargo box as in claim 2 in which said top panel connecting means comprises third readily releasable interlocking elements respectively unitary with and extending along the top edges of said side and end panels substantially from end to end thereof and unitary with and extending around the periphery of said top to connect said top panel to said side and end panels.

13. A cargo box as in claim 2 in which said elements comprise pairs of oppositely directed tongues, said tongues providing mating plane surfaces.

14. A cargo box as in claim 13 in which said tongues are generally wedge-shaped in cross section.

15. A cargo box as in claim 2 including gaskets running around the peripheries of said side panels and end panels and base for engagement by said elements to provide double watertight seals.

16. A cargo box as in claim 2 in which said elements comprise pairs of oppositely directed mating tongues providing grooves, and gaskets in said grooves for engagement by said tongues.